US008782226B2

(12) United States Patent
Christian et al.

(10) Patent No.: US 8,782,226 B2
(45) Date of Patent: Jul. 15, 2014

(54) ALLOCATING INTERNET PROTOCOL (IP) ADDRESSES TO NODES IN COMMUNICATIONS NETWORKS WHICH USE INTEGRATED IS-IS

(75) Inventors: Philip J Christian, Bishops Stortford (GB); Paul F Fee, Dungannon (GB)

(73) Assignee: Rockstar Consortium US LP, Plano, TX (US)

( * ) Notice: Subject to any disclaimer, the term of this patent is extended or adjusted under 35 U.S.C. 154(b) by 2776 days.

(21) Appl. No.: 09/991,386

(22) Filed: Nov. 13, 2001

(65) Prior Publication Data
US 2003/0093561 A1    May 15, 2003

(51) Int. Cl.
*G06F 15/16* (2006.01)

(52) U.S. Cl.
USPC .......................... 709/225; 709/228; 709/242

(58) Field of Classification Search
USPC .................... 709/242, 245, 225–226, 228
See application file for complete search history.

(56) References Cited

U.S. PATENT DOCUMENTS

| | | | |
|---|---|---|---|
| 5,251,205 A * | 10/1993 | Callon et al. ................... | 370/392 |
| 5,519,858 A * | 5/1996 | Walton et al. .................. | 709/218 |
| 5,854,901 A * | 12/1998 | Cole et al. ..................... | 709/245 |
| 5,917,820 A * | 6/1999 | Rekhter ......................... | 370/392 |
| 6,009,103 A * | 12/1999 | Woundy ......................... | 709/226 |
| 6,055,561 A * | 4/2000 | Feldman et al. ............... | 709/245 |
| 6,073,178 A * | 6/2000 | Wong et al. .................... | 709/245 |
| 6,345,294 B1 * | 2/2002 | O'Toole et al. ................ | 709/222 |
| 6,427,170 B1 * | 7/2002 | Sitaraman et al. ............. | 709/226 |
| 6,778,541 B2 * | 8/2004 | Houston et al. ................ | 370/401 |
| 6,820,134 B1 * | 11/2004 | Zinin et al. ..................... | 709/242 |
| 6,823,395 B1 * | 11/2004 | Adolfsson ...................... | 709/242 |
| 2002/0068570 A1 * | 6/2002 | Abrol et al. ................... | 455/438 |
| 2003/0036408 A1 * | 2/2003 | Johansson et al. ............. | 455/560 |

OTHER PUBLICATIONS

Hasegawa, Te.; Hasegawa, To.; Kato, T.; Yoshiizumi, K.; Miki, T.; Hokamura, K. and Sawada, K., "Protocol Architecture of High Speed TCP/IP Service Over International ATM Network," IEEE ATM Workshop Proceedings, May 26-29, 1998, pp. 159-168.*
IS-IS Search Networking Definition.
Resources for DHCP (Ralph Droms—Sep. 21, 2001).
Open System Interconnection (OSI) Protocols.
Use of OSI IS-IS for routing in TCP/IP and Dual Environments (R Callon) Dec. 1990.

* cited by examiner

*Primary Examiner* — Patrice Winder
*Assistant Examiner* — Ebrahim Golabbakhsh
(74) *Attorney, Agent, or Firm* — Christopher & Weisberg, P.A.

(57) ABSTRACT

Previously it has only been possible to allocate unique internet protocol (IP) addresses to nodes in open systems interconnection (OSI) communications networks such as those using integrated IS-IS, by manual configuration. This is time consuming and expensive because an operator must travel to the site of the node. By exploiting features of the OSI routing protocol the present invention enables IP addresses to be automatically allocated to the new network nodes. This is particularly advantageous for new intermediate systems such as optical multiplexers with integral routers. Once an IP address has been allocated, the node can be managed by a remote management system or operator using internet protocol methods.

11 Claims, 5 Drawing Sheets

| OSI Protocol Suite | | OSI Reference Model | |
|---|---|---|---|
| | | APPLICATION | 7 |
| | | PRESENTATION | 6 |
| | | SESSION | 5 |
| | | TRANSPORT | 4 |
| CONP/CMNS ES-IS | CLNP/CLNS IS-IS | NETWORK | 3 |
| | | DATA LINK | 2 |
| | | PHYSICAL | 1 |

PRIOR ART

Table showing the 7 OSI protocol layers and giving examples of network layer OSI protocols.

FIGURE 4

ALLOCATING INTERNET PROTOCOL (IP) ADDRESSES TO NODES IN COMMUNICATIONS NETWORKS WHICH USE INTEGRATED IS-IS

FIELD OF THE INVENTION

The present invention relates to a method of allocating internet protocol (IP) addresses to nodes in communications networks which use the integrated intermediate-system-to-intermediate-system (integrated IS-IS) routing protocol. The invention is particularly related to but in no way limited to optical communications networks, which comprise a plurality of directly connected routers or other intermediate systems.

BACKGROUND TO THE INVENTION

Intermediate-system-to-intermediate-system (IS-IS) protocol, also known as Dual IS-IS, is a member of the open systems interconnection (OSI) suite of protocols and is a collection of extensions to the base IS-IS protocol Integrated IS-IS was developed to allow routers to support both IP and OSI traffic in parallel.

One feature of IS-IS and Integrated IS-IS routed networks is that they do not require unique internet protocol addresses for each network node. Such OSI communications networks are increasingly integral with or connected to internet protocol communications networks such as the internet. However, because nodes in such OSI networks do not have IP addresses it is not possible to use internet protocol type methods to contact those nodes and carry out management or other tasks remotely over the communications network.

For example, consider a node such as an optical multiplexer in an optical communications network where the optical multiplexer incorporates a router and Integrated IS-IS routing protocol is used. When the new optical multiplexer and router are first installed in the communications network the router needs to be configured correctly in order to operate as required in the particular network environment it is placed in. (Also, if the OSI communications network is to route internet protocol (IP) packets, the router typically needs one IP address for each of its interfaces in order to function appropriately. At present, allocation of the required IP address is done by an operator who travels to the router site, makes a physical connection directly to the router using a text terminal, and manually allocates appropriate IP addresses to the router interfaces. This is obviously time consuming and expensive. It is not possible to remotely connect to the router over the network using internet protocol means because the router interfaces have no IP addresses by which they can be identified. This makes it very hard to remotely manage the router or other network node.

Known methods of automatically allocating IP addresses involve for example Dynamic Host Configuration Protocol (DHCP) or Bootstrap Protocol (BOOTP). However, both these methods are applicable to TCP/IP networks and are not best suited to communications networks which comprise a plurality of directly connected routers or other intermediate systems.

Bootstrap Protocol is defined in the Internet Engineering Task Force's (IETF's) request for comments (RFC) number 951. It is a protocol which enables a network user on a TCP/IP network to automatically receive an IP address and an operating system boot. A BOOTP server, managed by a network administrator, allocates the IP address automatically from a list of available addresses. However, the BOOTP method requires that for a new device to be added to a network and automatically assigned an IP address, it must be added so that it is directly connected to a BOOTP server. This is problematic for complex networks such as those which comprise a plurality of directly connected routers or other intermediate systems. In such cases, new network elements may need to be added so that they are indirectly connected to the BOOTP server. However, this is not possible without using a BOOTP relay server that is directly connected to the new network element. In order to provide an IP address to such a new network element, the BOOTP relay server is used, in addition to the BOOTP server itself. The BOOTP relay is connected directly to the new network element. This is obviously complex and requires BOOTP relay servers to be provided in addition to the BOOTP server.

BOOTP is the basis for DHCP which is a more advanced network management protocol. DHCP can be used to automatically assign IP addresses to hosts (e.g. personal computers, print servers, terminals, etc.) on a TCP/IP network. DHCP is described in IETF RFC 2131. However, DHCP suffers from the same drawbacks as BOOTP with respect to the need for new hosts to be directly connected to DHCP servers.

OBJECT TO THE INVENTION

An object of the present invention is to provide a method of allocating IP addresses to nodes in a communications network which uses integrated IS-IS routing protocol such that the method overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of automatically allocating a unique internet protocol (IP) address to a first node in an integrated intermediate-system-to-intermediate-system (IS-IS) communications network said method comprising the steps of:—
  accessing information about one or more potentially available IP addresses;
  selecting one of the potentially available IP addresses; and
  sending information about the selected IP address to nodes in the communications network.

This provides the advantage that the first node is automatically assigned an IP address without the need for manual configuration which is expensive and time consuming. For example, the first node may be an optical multiplexer with integrated router, another type of intermediate system, or other suitable network node. The information can be sent using a flooding method.

Preferably, said flooding method comprises the use of link state PDU (LSP) messages according to the integrated IS-IS protocol which is described in IETF RFC 1195. This provides the advantage that a simple way of informing network nodes of the new IP address is obtained that is effective and easy to implement.

In another example, said flooding method comprises an adaptation of the connectionless network service (CLNS) protocol. This is an alternative to using the LSP messages. However, any other suitable type of flooding method can be used.

Preferably said step of accessing information comprises accessing a server connected to the communications network. This provides the advantage that by using a central server to manage allocation of IP addresses, problems associated with duplication of IP addresses are avoided. Also, a central record of IP addresses is available to an administrator or other management system.

Alternatively said step of accessing information comprises accessing the first node which has pre-specified information about one or more potentially available IP addresses. This provides the advantage that no server for IP address allocation is required. Instead, pre-specified information about potential IP addresses is stored on each node.

Advantageously, the method further comprises using said selected IP address to access the first node using an Internet Protocol management system. This enables an administrator or management system to remotely access the first node using internet protocol methods. For example, the administrator could change the allocated IP address of the first node or carry out other administration and configuration tasks.

According to another aspect of the present invention there is provided a server connected to an integrated intermediate-system-to-intermediate-system (IS-IS) communications network and arranged to automatically allocate an internet protocol (IP) address to a first node in that communications network, said server comprising:—
- a store comprising information about one or more potentially available internet protocol (IP) addresses;
- a processor arranged to select one of the potentially available IP addresses; and
- an output arranged to issue one or more messages containing information about the selected IP address.

This provides the advantage that a server can be used to automatically allocate IP addresses to nodes in an OSI communications network.

According to another aspect of the present invention there is provided a communications network node for use in an integrated intermediate-system-to-intermediate-system communications network and requiring a unique internet protocol (IP) address, said communications network node comprising:—
- a store comprising information about one or more potentially available internet protocol (IP) addresses;
- a processor arranged to select one of the potentially available IP addresses; and
- an output arranged to issue one or more messages containing information about the selected IP address.

According to another aspect of the present invention there is provided a signal comprising one or more integrated intermediate-system-to-intermediate-system routing protocol messages, at least one of those messages comprising information about an internet protocol address and an associated node.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 4 is a table showing the seven OSI protocol layers according to the prior art.

DETAILED DESCRIPTION OF INVENTION

Figure 1:
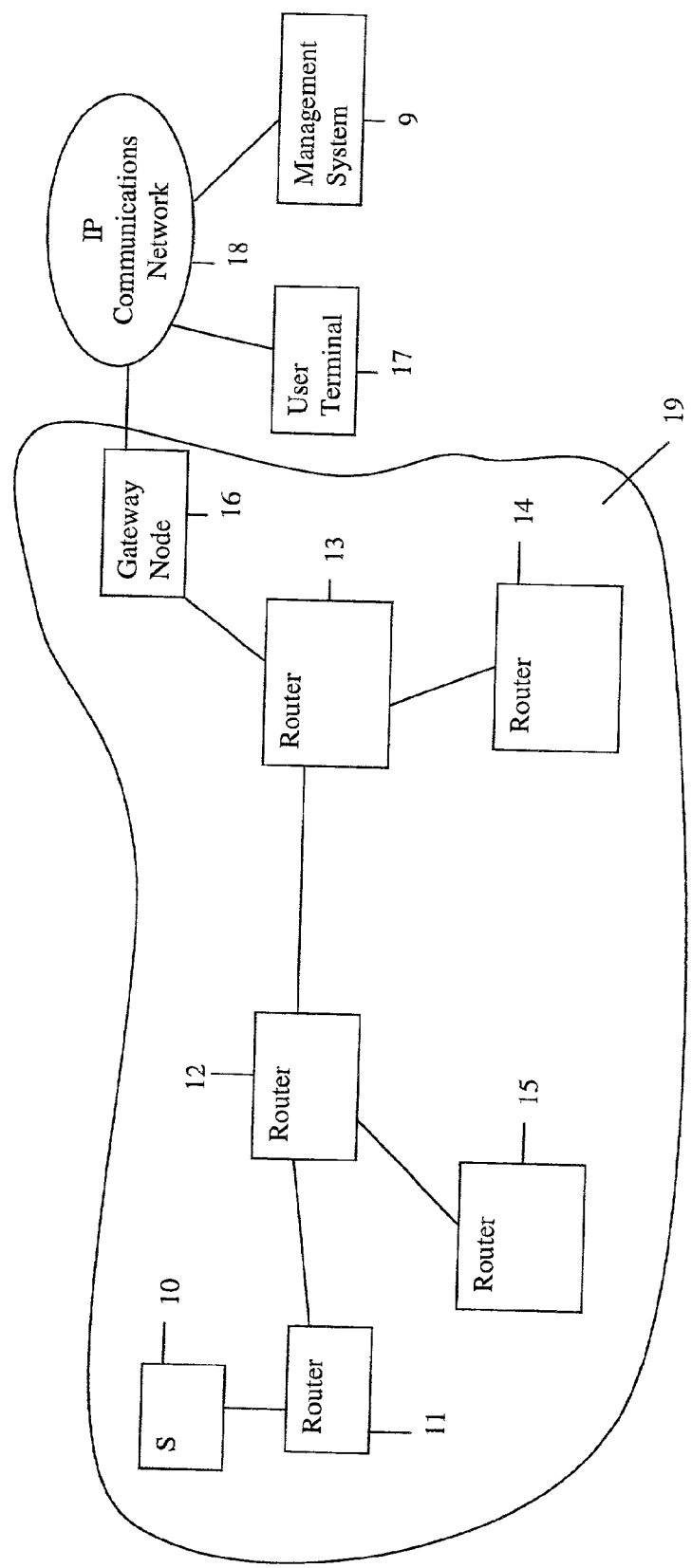
FIG. 1 is a schematic diagram of an open systems interconnection (OSI) communications network according to the present invention.

Embodiments of the present invention are described below by way of example only. These examples represent the best ways of putting the invention into practice that are currently known to the Applicant although they are not the only ways in which this could be achieved.

A communications network can be considered as a plurality of nodes interconnected by links. Some of the nodes provide access points at which users (human or computer applications) can access the communications network. Such nodes providing access points are referred to as end systems (ES's) whilst nodes that are connected between such ES's are referred to as Intermediate Systems (ISs).

The present invention is concerned with packet based, connectionless communications networks in which communications take place by sending packets (also known as protocol data units) containing user data and control or signalling data between ES's via IS's. In order to effect the communication a particular method or set of rules is followed which is referred to as a communications protocol. A communications protocol is typically formed from a plurality of sub-methods or protocol layers which can be considered as forming a protocol stack.

The Open System Interconnection (OSI) protocols are a suite of protocols for use in a communications network that is considered as comprising seven layers as illustrated in FIG. 4. OSI defines one or more protocols that can be used for each of these seven layers to form a protocol stack.

The present invention is particularly concerned with intermediate systems (IS's) which handle only protocol information at and below the network layer (layer 3) whereas end systems (ES's) use protocols at all the seven layers.

At the network layer, the OSI protocol suite specifies a routing protocol, called intermediate-system-to-intermediate-system (IS-IS) as well as an end-system-to-intermediate-system protocol (ES-IS). OSI also provides specification about other features of the network layer. These include:
  ISO (International Standardisation Organisation) 8648—which defines the internal organisation of the network layer;
  ISO 8348—which specifies network-layer addressing; and
  ISO TR9575—which defines the framework, concepts and terminology used in relation to OSI routing protocols.

In the case that OSI is used to provide a connectionless communications network, further network layer protocols are used. These comprise Connectionless Network Protocol (CLNP) and Connectionless Network Service (CLNS), as defined in the ISO 8473 standard.

As mentioned above, the OSI routing protocol IS-IS and its extension, integrated IS-IS, do not use unique IP addresses for each network node. Previously, in order to provide nodes in OSI networks with IP address manual configuration has been required. The present invention provides a way of avoiding this in integrated IS-IS networks by allocating IP addresses automatically.

Integrated IS-IS is defined in IETF RFC 1195 (December 1990) and as mentioned above it was developed to allow routers to support both IP and OSI traffic in parallel. The integrated IS-IS protocol is able to support pure-IP environments. Thus the present invention is applicable to all those types of environment in which it is required to automatically allocate IP addresses to network nodes. For example, interconnection of dual (IP and OSI) routing domains with other dual domains, with IP-only domains or with OSI-only domains is made possible. Although IETF RFC 1195 refers in detail to IP version 4 the invention described herein is equally applicable to IP version 6 and other suitable IP versions.

Integrated IS-IS protocol comprises a method using so called LSP (link state PDU (protocol data unit)) messages. These are arranged to provide a type of flooding mechanism. When an integrated IS-IS intermediate system receives an LSP, it makes a record of the information within that LSP and then forwards the LSP on to all its neighbours. This method is used to enable each intermediate system to maintain a current picture of network topology. The present invention however, makes use of LSP messages to perform the additional function of flooding information about new IP addresses. Although Integrated IS-IS can route IP packets it does not use IP addresses or IP packets in order to transmit topology information or to form adjacencies. This means that when a new network node is added to an Integrated IS-IS network, that new node is able to operate immediately without the need to be assigned an IP address. This differs from IP based routing protocols such as open shortest path first (OSPF) where new routers require an IP address in order to form adjacencies, transmit topology information and start routing. Also, each network node in an Integrated IS-IS or IS-IS network has a unique system identifier (SID). These SIDs may be derived from a unique MAC (media access control) address that is allocated to the node during the manufacturing process.

Figure 2:
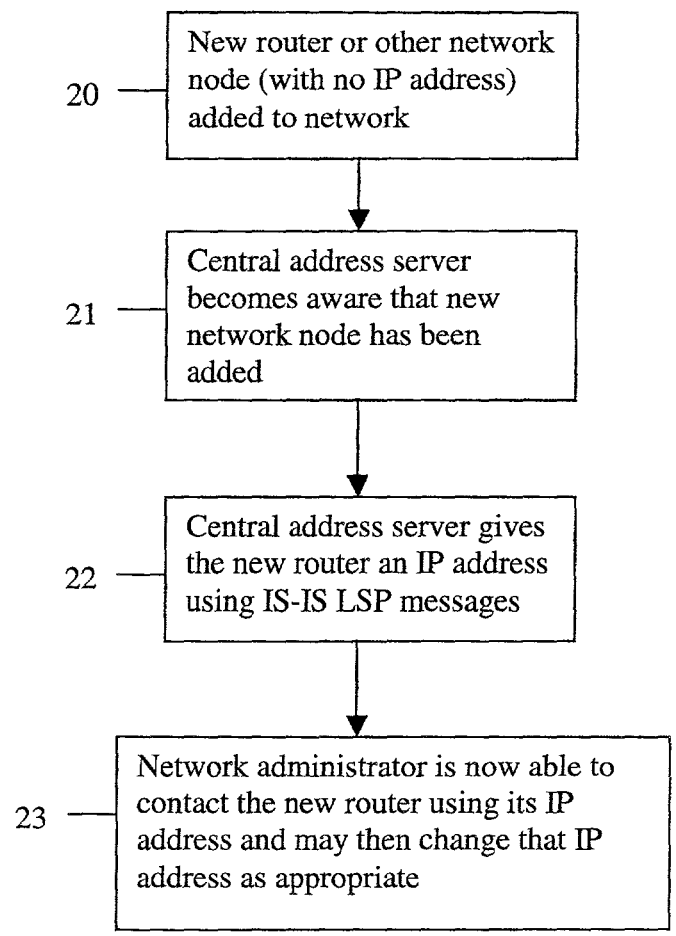
FIG. 2 is a flow diagram of a method of automatically allocating an IP address to a node in an OSI network.

FIG. 2 is a flow diagram of a method by which LSP messages are used in conjunction with a central server, to automatically allocate an IP address to a new network node in an integrated IS-IS communications network. The new network node is preferably an intermediate system but may be any type of network node.

In this method, a central server is provided connected to the OSI communications network. The central server comprises a store or database containing information about existing network nodes and their corresponding IP addresses. In addition the central server has information about one or more IP addresses which are available for use in the communications network.

When a new network node, which has no IP address, is added to the communications network (see box 20 of FIG. 2) it sends a message to the central server to request an IP address. This can be achieved in any suitable manner. For example, the new network node may have access to pre-specified information about the location of the central server. Alternatively, the new network node may receive LSP extensions which provide the address of the central server. Another possibility is that the new node simply broadcasts a request and this eventually reaches the central server. By any such suitable means, the central server becomes aware of the new network node (box 21 in FIG. 2).

The central server then takes one of the IP addresses which it has available for use and informs the new network node, and other nodes in the network about this using the LSP mechanism. That is, the central server issues one or more LSPs with extensions containing information about the new IP address and associated node (see box 22 of FIG. 2). The LSPs and extensions are forwarded through the network as described above and eventually the new network node receives one and obtains its IP address.

Figure 5:
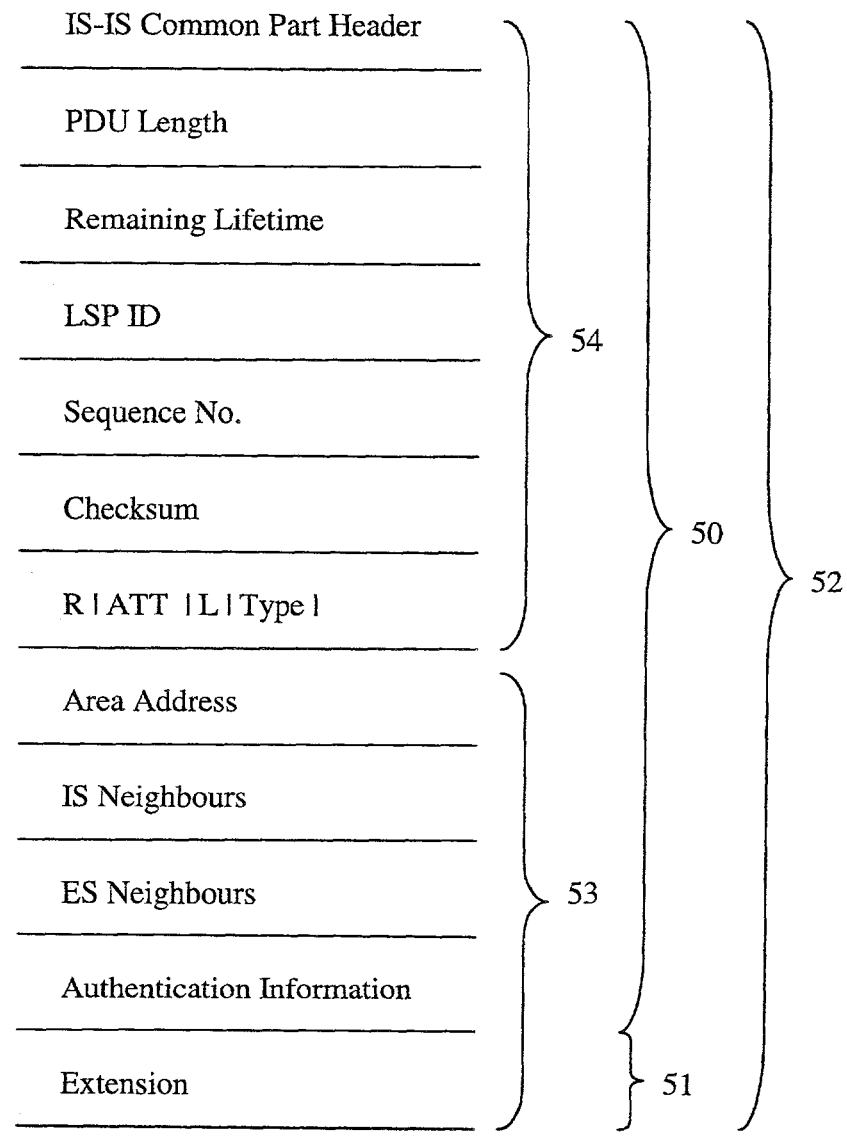
FIG. 5 is a schematic diagram of a link state PDU and extension.

FIG. 5 is a schematic diagram of an LSP control or signalling message 52 comprising an LSP 50 and an LSP extension 51. The IP address is added to the LSP extension and intermediate system nodes are arranged to recognise such LSP extensions. Advantageously, any nodes which do not understand or recognise LSP extensions simply ignore the extension and deal with the LSP part of the message as normal. This is advantageous because it is not necessary to enable all network nodes to understand or recognise the LSP extensions whilst still enabling the IP address information to spread through the network.

A network administrator is then able to connect to the communications network and obtain information about the new node's IP address either from the central server of from any node which maintains topology information. Using that IP address the network administrator is able to use internet protocol methods to contact and manage the new network node remotely over the communications network. For example, the network administrator could change the allocated IP address to another IP address or perform other configuration actions (see box 23 of FIG. 2).

By using a central server in this way it is easy to ensure that all the network nodes have unique IP addresses and problems with duplicate IP addresses are avoided.

In another embodiment, no central server is required. Instead a new node is able to select its own IP address from a plurality of pre-specified IP addresses. This is now described with reference to FIG. 3. LSP messages are again used but this time LSP extensions 51 are not required; instead the IP address information is carried in the LSP 50 itself. An advantage of this is that no TLV needs to be requested from the IETF or ISO as described below. As before, the new node is preferably an intermediate system but this is not essential.

Figure 3:
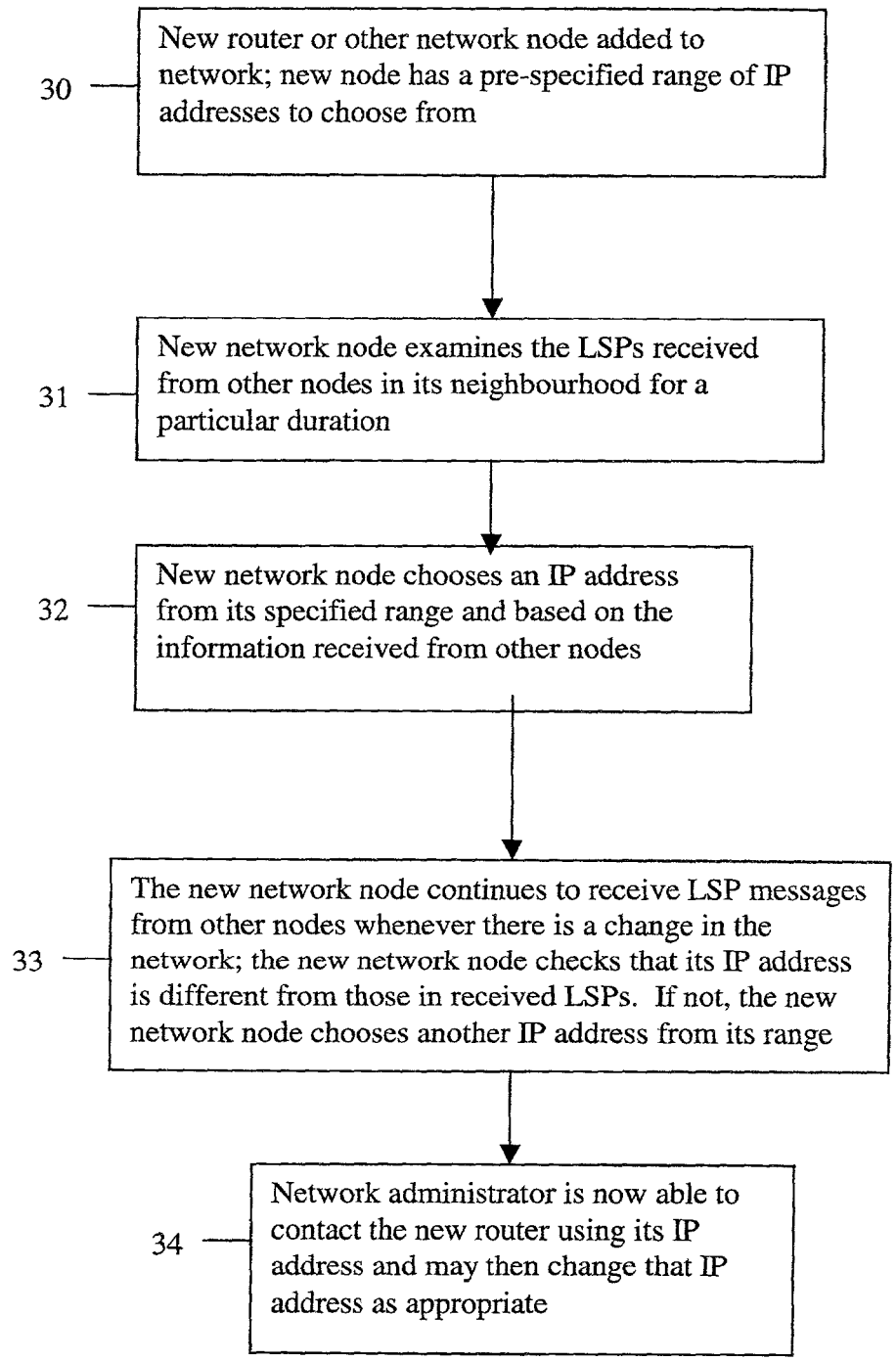
FIG. 3 is a flow diagram of another method of automatically allocating an IP address to a node in an OSI network.

In this example, each new network node has one or more pre-specified IP addresses (see box 30 of FIG. 3). For example, these may be allocated to the network node during the manufacturing process. When the new network node is added to the communications network it waits for a specified duration and receives LSPs from other network nodes during that time. The new network node examines those LSPs (see box 31) which contain topology information and information about the IP addresses of other nodes in the communications network. For example, FIG. 5 has a schematic diagram of a LSP 50 which comprises a fixed part 54 and a variable part 53. The fixed part contains a field (LSPID) which contains the address of the node which created the LSP and this address can be an IP address. The variable part 53 contains addresses of any IS neighbours of the node which created the LSP and also addresses of any ES neighbours of that node.

Once the specified duration is over, the new network node allocates itself an IP address by selecting one IP address from those pre-specified IP addresses associated with it. This selection is made on the basis of the information received in LSPs (see box 32 of FIG. 3). For example, those LSPs may contain information about two other IP addresses. The new network node then assumes that those two IP addresses are in use and does not select them.

The new network node now has an IP address and the network administrator or management system is able to contact the new node using its IP address as in box 23 of FIG. 2 and box 34 of FIG. 3. The new network node generates its own LSPs containing its chosen IP address and forwards those to other nodes in the network.

In the case that two new network nodes are added to the network simultaneously, there is a possibility that these two nodes will be allocated the same IP address. To avoid this, the new network nodes continue to check all LSPs they receive for IP addresses. If the IP address in a received LSP message is the same as the network node's own IP address, then that network node selects a different IP address from the pre-specified addresses available to it (see box 32 of FIG. 3). In this way, the problem of duplicate IP addresses being used is reduced without the need for a central server to be provided.

In another embodiment, the CLNS protocol is made use of as opposed to the LSP method of Integrated IS-IS protocol. A flooding type method is created for use in CLNS similar or equivalent to the LSP method of integrated IS-IS. This is then used to broadcast the information about the new node's IP address. Either of the methods of FIGS. 2 and 3 can be used but replacing the LSP method by a CLNS flooding method and ensuring that the network nodes are able to understand CLNS in order to obtain the IP address information from the CLNS messages. This provides the advantage that no information needs to be added to LSP messages of integrated IS-IS. In order to add such information a TLV (type length value) needs to be requested from the IETF or ISO and so by adapting CLNS instead this need is avoided. Any suitable flooding method can be provided within the CLNS protocol.

In another embodiment, a central address server is used as in the method of FIG. 2, but without the need to use LSP extensions. This has the advantage that no TLV number needs to be requested from the IETF or ISO. In this embodiment, the IP address for the new node is carried in the LSP 50 itself, for example in the LSPID field, the IS neighbours field or the ES neighbours field (see FIG. 5). In order to explain this embodiment, some background information about LSPs and their use according to the prior art is now given. Routers in an integrated IS-IS network each maintain a link state database which contains a record of the most recent LSP received from various other routers in the network. Each LSP has a sequence number (see FIG. 5) to distinguish between LSPs created by the same node. For example, if the first LSP created by a node has sequence number 1 then the second LSP created by that node has sequence number 2. When a router receives an LSP it decides whether to update its link state database with the received LSP. For example, if the received LSP is older than a corresponding LSP in the database (as determined by the sequence number and LSPID) then it is simply forwarded on with no database update being done. If the received LSP is more recent than any corresponding LSP in the database, then the received LSP is used to overwrite that corresponding LSP in the database. The received LSP is also forwarded on to all the node's neighbours.

The present invention makes use of this behaviour with respect to sequence numbers in order to pass on IP address to a new node. The method is the same as that described in FIG. 2, except for the manner in which box 22 is implemented. The central server generates an LSP which has an anomalous sequence number and which contains the IP address for the new node, stored in the LSP itself, for example in the LSPID field, ES neighbours field, IS neighbours field or any other suitable field. The new node is arranged to retain any LSPs it receives with anomalous sequence numbers and to determine its IP address by accessing a pre-specified field of such LSPs. Any suitable anomalous sequence number may be used such as one which is more than a specified number of units higher than current average sequence numbers.

In the example of FIG. 2 the central address server becomes aware that a new network node has been added to the network (box 21 of FIG. 2) and as explained above this is achieved in any suitable manner. For example, the new network node can indicate to the server that it needs an IP address by for example:

issuing LSPs that indicate that the new node supports IP but which do not provide an IP address;
issuing LSPs that contain an anomalous IP address such as one with a sub-net mask of all zeros;
issuing LSPs that contain a pre-specified IP address;
issuing LSPs that contain anomalous, "fake", or pre-specified adjacency information.

These methods can also of course be used by a server which wishes to advertise the fact that it is capable of assigning IP addresses.

In a preferred example, the new network node issues LSPs that contain an anomalous IP address. The server receives these LSPs and realises that the originating node requires an IP address. The server then overwrites the anomalous IP address with an IP address suitable for the new node, increases the LSP's sequence number, and forwards that LSP back to the originating node. The originating node realises that the sequence number is too high and so realises that the LSP contains an IP address for itself. (Please add more detail here if necessary. For example, where is the IP address stored in the LSP?)

FIG. 1 is a schematic diagram of an open systems interconnection (OSI) communications network according to the present invention. One or more intermediate systems, such as routers 11 to 15, are connected together within the network, which also comprises end-systems and user terminals although these are not shown for clarity. In the embodiment of FIG. 2 a server 10 is used as illustrated in FIG. 1 although this is not essential. The OSI network 19 is connected via a gateway node 16 to an internet protocol communications network 18 such as the Internet. Using the methods of the present invention, one or more of the routers 11 to 15 are each automatically allocated an IP address. This may be any suitable type of IP address such as IP version 4 or IP version 6. Once a router is allocated an IP address, a human operator or automated management system is able to remotely manage that router for example, using a user terminal 17 connected to the IP network 18 or a management system 9.

A range of applications are within the scope of the invention. These include situations in which it is required to allocate IP addresses automatically to nodes in an OSI communications network, such as an integrated IS-IS network.

The invention claimed is:

1. A method of automatically allocating a unique internet protocol (IP) address to a first node in an integrated intermediate-system-to-intermediate-system (IS-IS) communications network that is configured to use the IS-IS routing protocol, the method comprising:
    accessing information about a plurality of IP addresses;
    allocating one of the plurality of IP addresses to the first node; and
    sending, using a link state protocol data units flooding method, information about the allocated IP address to the first node in the IS-IS communications network, the allocated IP address to be used to communicate with the first node.

2. A method as claimed in claim 1 wherein the sent information is sent using the link state protocol data unit extensions.

3. A method as claimed in claim 1 wherein accessing information comprises accessing a server connected to the communications network.

4. A method as claimed in claim 1 wherein the sent information is sent using the link state protocol data units with anomalous sequence numbers.

5. A method as claimed in claim 1 further comprising using said allocated IP address to access the first node using an Internet Protocol management system.

6. A method as claimed in claim 1 wherein said first node is one of an intermediate system, a router and an optical multiplexer with integral router.

7. A server connected to an integrated intermediate-system- to-intermediate system (IS-IS) communications network and arranged to automatically allocate an internet protocol (IP) address to a first node in the IS-IS communications network, the first node configured to use the IS-IS routing protocol, said server comprising: a store configured to include information about a plurality of IP addresses; a processor configured to allocate one of the plurality of IP addresses to the first node; and an output configured to issue, using a link state protocol data units flooding method, at least one message containing information about the allocated IP address to the first node and other nodes in the IS-IS communications network, the allocated IP address to be used to communicate with the first node.

8. An integrated intermediate-system-to-intermediate-system (IS-IS) communications network comprising a server configured to automatically allocate an internet protocol (IP) address to a first node in said communications network that is configured to use the IS-IS routing protocol, said server comprising:

a store configured to include information about a plurality of IP addresses;

a processor configured to allocate one of the plurality of IP addresses to the first node, the allocated one of the plurality of IP addresses being a unique IP address at which the first node may be contacted; and an output configured to issue, using a link state protocol data units flooding method, at least one message containing information about the allocated IP address to at least the first node in the IS-IS communications network, the allocated IP address to be used to communicate with the first node.

9. The method of claim 1, further comprising determining that the first node has been logically added to the network, the first node having no assigned IP address until after the first node is informed of the IP address allocated to the first node.

10. The server of claim 7, wherein the processor is further configured to determine that the first node has been logically added to the network, the first node having no assigned IP address until after the first node is informed of the IP address allocated to the first node.

11. The IS-IS communications network of claim 8, wherein the processor is further configured to determine that the first node has been logically added to the network, the first node having no assigned IP address until after the first node is informed of the IP address allocated to the first node.

* * * * *